US006932680B1

(12) United States Patent
Collins

(10) Patent No.: US 6,932,680 B1
(45) Date of Patent: Aug. 23, 2005

(54) TOOL MOUNTING ASSEMBLY

(76) Inventor: Anthony Collins, P.O. Box 498, Belmont New South Wales 2280 (AU)

( * ) Notice: Subject to any disclaimer, the term of this patent is extended or adjusted under 35 U.S.C. 154(b) by 0 days.

(21) Appl. No.: 10/853,521

(22) Filed: May 25, 2004

(30) Foreign Application Priority Data

May 30, 2003 (AU) .............................. 2003902698

(51) Int. Cl.⁷ .......................................... B29D 30/68
(52) U.S. Cl. ............................. 451/69; 157/13; 83/914
(58) Field of Search ........................... 451/419, 67, 69, 451/73; 157/13; 82/49; 83/914

(56) References Cited

U.S. PATENT DOCUMENTS 3,993,116 A    11/1976  Brewer
4,116,256 A *   9/1978  Morris et al. ................... 157/13
5,307,854 A     5/1994  Brewer
6,655,438 B2 * 12/2003  Trochon et al. ............... 157/13
6,745,809 B1 *  6/2004  Mory et al. .................... 157/13
2004/0200579 A1 * 10/2004  Mory et al. .................... 157/13

* cited by examiner

Primary Examiner—Jacob K. Ackun, Jr.
(74) Attorney, Agent, or Firm—Tucker Ellis & West LLP

(57) ABSTRACT

A tool mounting assembly including a tool support means which includes tool holders adapted for receiving an associated tool and enabling rotation of the associated tool about a rotation axis. The tool mounting assembly further including means for causing relative movement between the tool holders in the direction of the rotation axis so to enable the tool holders to adopt an operative position in which the associated tool is held thereby and the release position in which the associated tool is enabled to be removed from the mounting assembly.

24 Claims, 4 Drawing Sheets

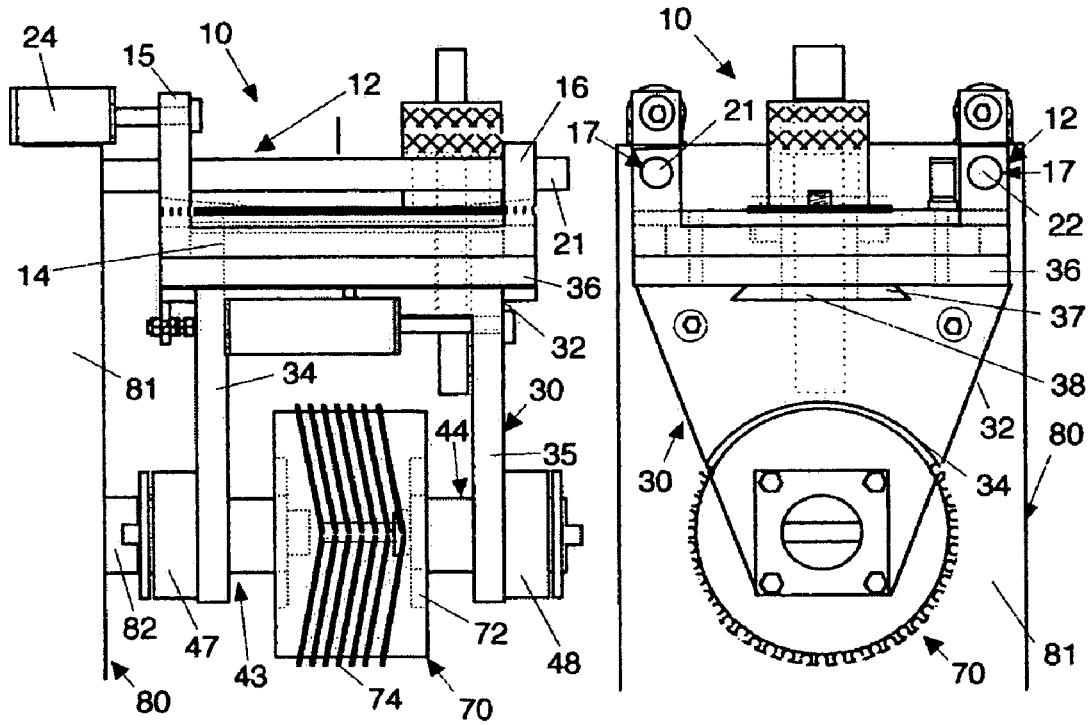
FIG. 1  FIG. 2
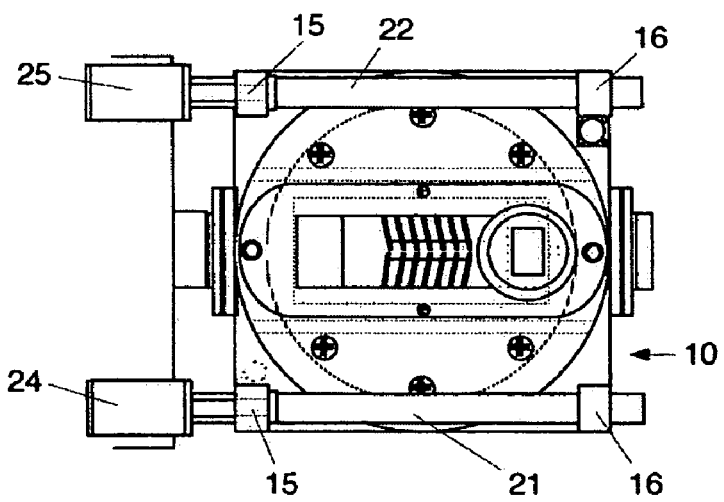
FIG. 3

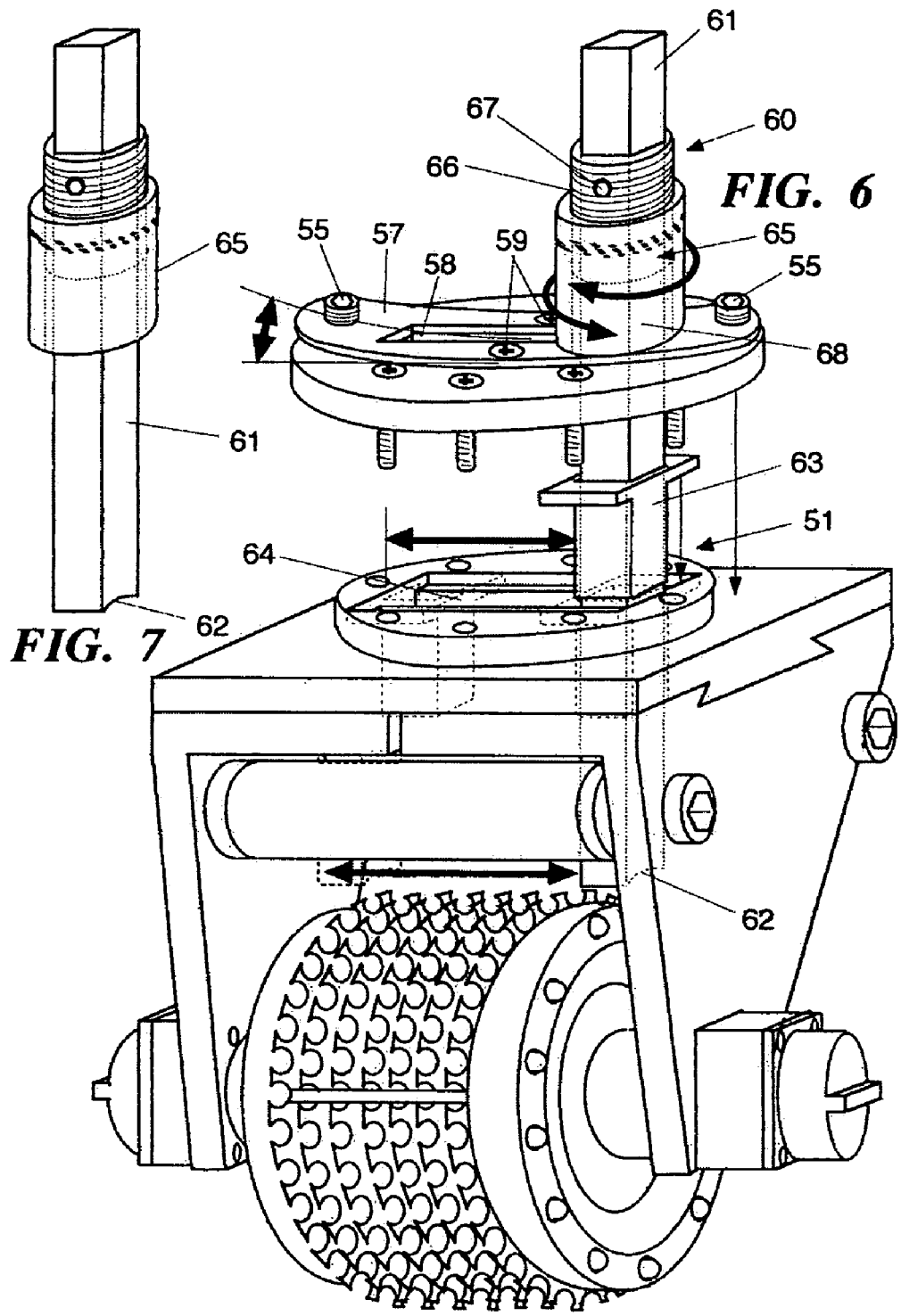

TOOL MOUNTING ASSEMBLY

FIELD OF THE INVENTION

This invention relates to a mounting assembly for mounting a tool to a machine.

BACKGROUND OF THE INVENTION

One particular application of the invention is concerned with machines for use in the retreading of tyres. These machines are often referred to as buffing machines and include a tool which removes rubber from the tyre prior to the retreading procedure. The tool maybe in the form of a drum having cutting teeth or blades arranged on the outer surface thereof. The drum is mounted for rotation about its central axis. Such a tool is often referred to as a rasp.

When the rubber is removed from the tyre by the buffing machine the removed rubber may be in the form of long strips, large chunks, medium particles, small crumb size and fine dust. Rubber is very abrasive and as a result the blades on the tool can become blunt very quickly. During the buffing process the blades not only cut into the rubber but also impact with any foreign objects that may be embedded therein. The blades are thin and designed to cut through rubber but not to impact and grind foreign objects such as glass, nails, stones and the like embedded in the surface of the rubber. These objects when dislodged from the tyre are quite dangerous to the operator and it is desired that the objects are directed to an extraction system for drawing the removed rubber and foreign objects away from the operator.

Because of the high wear on the blades, they are designed to be able to cut in both directions of rotation and as such it is necessary to remove the tool from its mounting so that it can be turned so that both sides of the cutting blades can be used. This can be a tedious and time consuming operation.

SUMMARY OF THE INVENTION

There are several distinct and separate aspects to the present invention which as a matter of convenience will hereinafter be described in combination. It is to be understood however this is not to be taken as a limitation as to the scope of the invention in any of its distinct aspects.

According to one aspect of the present invention there is provided a tool mounting assembly for a tool, the assembly including a tool support means which includes tool holders for receiving the tool and enabling rotation of the tool about a rotation axis. The assembly further includes means for causing relative movement between the tool holders in the direction of the axis of rotation so that the tool holders can adopt an operative position in which the tool is held thereby and the release position in which the tool can be removed from the mounting assembly.

In one form the tool support means may include two spaced apart support arms having a tool holder thereon. The support arms being arranged for movement relative to one another between the operative and release positions.

The tool support means a further include a mounting member to which each of the support arms are operatively connected. Preferably one or both of the support arms include a cooperating tongue and groove guide for enabling relative sliding movement between the two parts.

Drive means may be provided for causing the aforementioned relative movement. Such drive means may be in the form of a linear actuator such as a hydraulic piston cylinder assembly. In one form the tool holders may include shafts each being respectively coupled to opposite sides of the tool. One or both of the shafts may be adapted to be operatively connected to drive means so that rotation of the shaft causes rotation of the tool when in the operative position. Preferably keying means is provided between the shafts and the tool.

According to another aspect of the present invention there is provided a tool mounting assembly for a tool, the assembly including a tool support means for supporting the tool for rotation about a rotation axis, a carriage and means for coupling the tool support means to the carriage for rotation relative thereto so that the tool can be rotated about an axis generally at 90° to the axis of rotation.

In one form the assembly includes a turn table which is operatively connected between the tool support means and the carriage for enabling relative rotation therebetween. Releasable locking means may be provided which is movable between a locking position in which the carriage and tool support means are held against relative rotation and an unlocked position. The locking means may include a locking pin on one of the parts which is receivable in an aperture in the other of the parts. The assembly may further include means for moving the carriage laterally.

The tool support means for this aspect of the present invention may be in the form earlier described.

According to yet another aspect of the present invention there is provided a tool mounting assembly for a tool, the assembly including a tool supporting means for support a tool for rotation about a rotation axis, a tool sharpening device operatively connected to the tool support means and including a tool sharpening element which is movable relative to the tool support means and guide means for guiding the tool sharpening element relative to the tool.

In one form the guide means may be adjustable so that the path of traverse can either be linear or curved.

The sharpening element may include an elongated member with the working tip at one end thereof and the guide means include a guide block to which the element is mounted. The guide block being receivable within a cooperating guide slot in the tool support means.

Preferably the sharpening element is axially movable relative to the guide block. To this end an adjustable screw element may be provided for causing the axial movement.

BRIEF DESCRIPTION OF THE DRAWINGS

In order to enable a clearer understanding of the invention, drawings illustrating example embodiments are attached, and in those drawings:

FIG. 1 is a schematic side elevation of apparatus according to a preferred embodiment of the present invention;

FIG. 2 is an end elevation of the apparatus shown in FIG. 1;

FIG. 3 is a plan view of the apparatus shown in FIGS. 1 and 2;

FIG. 6 is an exploded view of the apparatus shown in FIGS. 1 to 3 with certain parts not shown for the purpose of clarity; and FIG. 7 is an isometric view of a tool sharpening element shown in FIG. 6.

DETAILED DESCRIPTION OF THE DRAWINGS

Figure 4:
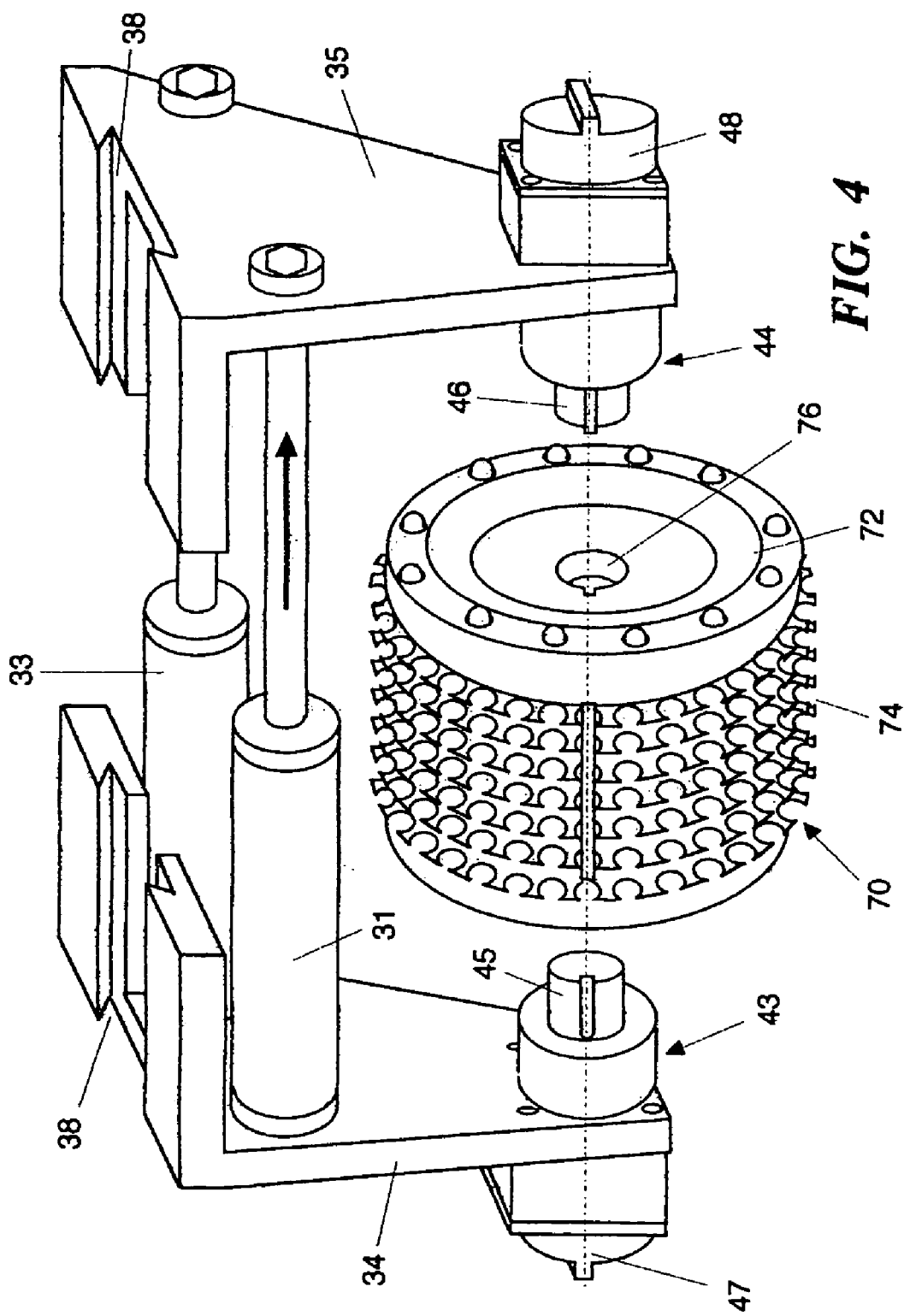
FIG. 4 is a detail of part of the apparatus shown in FIGS. 1 to 3.
Figure 5:
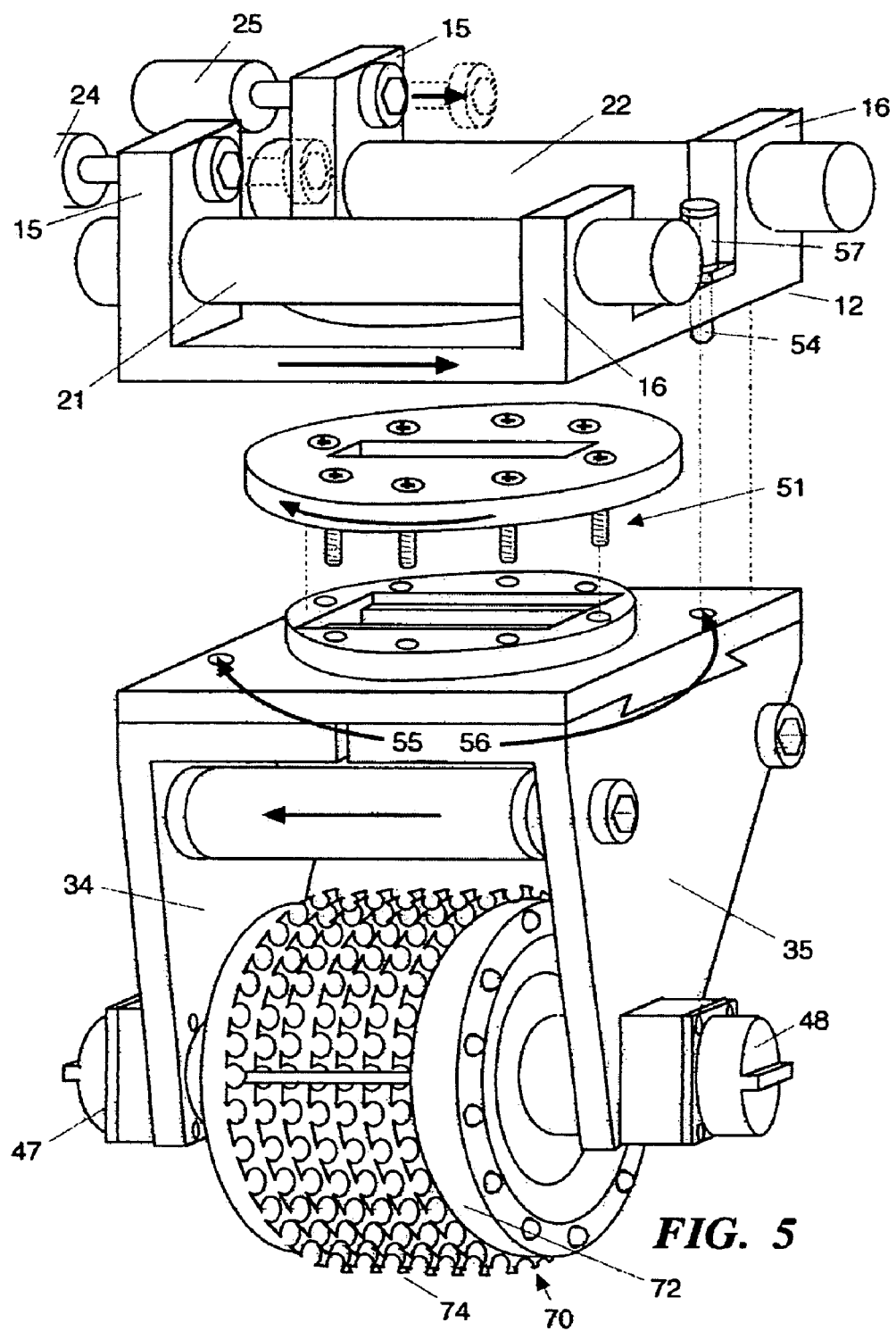
FIG. 5 is an exploded view of the apparatus shown in FIGS. 1 to 3 with certain parts not shown for the purpose of clarity.

Referring to the drawings there is shown a tool mounting assembly generally indicated at 10, the assembly being adapted to be mounted to a machine 80 having a machine body 81. The machine 80 includes a motor (not shown) having an output shaft to which a coupling element 82 is operatively connected. The machine shown is in the form of a buffing machine for tyres and the mounting assembly 10 is adapted to receive a tool 70 which is in the form of a rasp having a hub or drum 72 with a series of cutting blades 74 on the outer surface thereof. The hub drum 72 has a keyed mounting aperture 76 therein the purpose of which will hereinafter be described.

The tool mounting assembly 10 includes a carriage 12 which includes a base plate 14 with pairs of upright flanges 15 and 16 at opposite ends of the base plate 14, the flanges having mounting apertures 17 therein for receiving rails 21 and 22 in the form of rods which in turn are operatively connected to the machine body 81. The carriage 12 is arranged for sliding movement along the rails 21 and 22 so that the mounting assembly can move towards or away from the machine body 81. Linear actuators in the form of hydraulic cylinders 24 and 25 are operable to cause movement of the carriage 12 along the rails 21 and 22.

The tool mounting assembly 10 further includes a tool support section 30 to which the tool 70 is operatively mounted. The tool support section 30 includes a support body 32 including support arms 34 and 35 operatively connected to a coupling plate 36 at least one of which is arranged for sliding movement relative thereto. The connection between the coupling plate 36 and support arms 34 and 35 is via a tongue 37 and groove 38 formed on respective parts. Linear actuators in the form of hydraulic cylinders 31 and 33 cause relative movement between the arms 34 and 35 and coupling plate 36.

The tool support section 30 further includes tool holders 43 and 44 in the form of stub axles 45 and 46 these stub axles being keyed and receivable within mounting apertures 76 on the tool 70. Each stub axle 45 and 46 has a coupling element 47 and 48 thereon which are adapted to selectively cooperate with coupling element 82 on the output shaft of the machine.

The tool support section 30 is operatively connected to the carriage 12 by means of a turntable 51 so that under selected circumstances the tool support section 30 can be rotated relative to the carriage 12. A releasable locking pins 54 on the carriage 12 is selectively receivable within one of apertures 55 or 56 on the tool support section 36 to inhibit relative rotation between the two parts. Pin 54 can be raised or lowered by hydraulic cylinder 57.

The tool mounting assembly 10 further includes a tool sharpening device 60 including a tool sharpening element 61 having a working tip 62. The sharpening element 61 is mounted to a guide block 63 which is received within a guide slot 64. In use the working tip 62 is disposed adjacent to and above the tool. The sharpening element 61 is axially movable relative to the guide block by means of an adjustable screw element 65. The adjustable screw element 65 includes a threaded member 66 fitted to tool sharpening element by grub screw 67 and a complementary rotatable sleeve 68 which can be manually rotated to cause axial movement of the tool sharpening element 61.

A tracking guide 57 enables the trip to traverse the tool along a curved path. The tracking guide 57 is in the form of a spring steel plate having a guide slot 58 therein, the plate being connected to part of the turnable 51 via fixing screws 59. Adjustment screws 55 enable the curvature of the plate to be altered.

The operation of the various parts of the mounting assembly will hereinafter be described.

In the position shown in FIGS. 1 to 3 coupling element 47 of the tool holder 43 is operatively connected to coupling element 82 on the power output shaft. In this coupled position the machine is ready for operation in the normal fashion.

If the tool 70 requires replacement or removal from the machine hydraulic cylinders 31 and 33 are activated causing support arm 35 to move away from support arm 34 thereby enabling release of the tool 70 from stub axles 45 and 46. The fitting of a tool can be effected in a similar manner.

As mentioned earlier it is the practice to reverse the tool 70 so that the cutting blades can be selectively utilised in both rotational directions of the tool. To perform this operation the hydraulic cylinders 24 and 25 are activated so as to move the carriage 12 and the tool support section 30 away from the machine body 81 thereby disconnecting coupling element 47 from coupling element 82. The tool 70 is still held by arms 34 and 35. Activation of hydraulic cylinder 57 causes release of pin 54 from aperture 56. The tool support section 30 can then be rotated relative to the carriage 12 on turntable 51. When the tool support section 30 has been rotated 180° the pin 54 is aligned with aperture 55 and hydraulic cylinder 57 activated to move the pin 54 into aperture 55 to lock the two parts together. The hydraulic cylinders 24 and 25 are then activated to return the carriage 12 and support section 30 to the operative position where coupling element 48 engages with coupling element 82. The machine is again ready for use.

In sharpening operation the curvature of the tracking guide 57 can be adjusted by means of adjustment screws 55 to allow for a parallel or linear or concave or convex traverse. The sleeve is gripped and manually moved across the tool to effect the desired sharpening thereof. As the sharpening tool wears it can be moved downwardly by the adjustable screw member.

Finally, it is to be understood that various alterations, modifications and/or additions may be incorporated into the various constructions and arrangements of parts without departing from the spirit or ambit of the invention.

I claim:

1. A tool mounting assembly, the assembly including a tool support means which includes tool holders adapted for receiving an associated tool and enabling rotation of the associated tool about a rotation axis, the tool mounting assembly further including means for causing relative movement between the tool holders in the direction of the rotation axis so to enable the tool holders to adopt an operative position in which the associated tool is held thereby and the release position in which the associated tool is enabled to be removed from the mounting assembly.

2. A tool mounting assembly according to claim 1 wherein the tool support means includes two spaced apart support arms having a tool holder thereon.

3. A tool mounting assembly according to claim 2 wherein the support arms are arranged for movement relative to one another between the operative and release positions.

4. A tool mounting assembly according to claim 2 wherein the tool support means further includes a mounting member to which each of the support arms are operatively connected.

5. A tool mounting assembly according to claim 2 wherein at least one of the support arms includes a cooperating tongue and groove guide for enabling relative sliding movement between the two arms.

6. A tool mounting assembly according to claim 5 wherein drive means are provided for causing the relative movement.

7. A tool mounting assembly according to claim 6 wherein drive means are in the form of a linear actuator such as a hydraulic piston cylinder assembly.

8. A tool mounting assembly according to claim 1 wherein the tool holders include a plurality of shafts, each shaft being respectively coupled to opposite sides of the tool.

9. A tool mounting assembly according to claim 8 wherein at least one of the shafts is adapted to be operatively connected to drive means so that rotation of the shaft causes rotation of the tool when in the operative position.

10. A tool mounting assembly according to claim 8 wherein keying means is located between the shafts and the tool.

11. A tool mounting assembly, the assembly including a tool support means for supporting the tool for rotation about a rotation axis, a carriage and coupling means for coupling the tool support means to the carriage for rotation relative thereto so to enable that the tool to be rotated about an axis generally at 90° to the axis of rotation, wherein the coupling means includes a turntable which is operatively connected between the tool support means and the carriage for enabling relative rotation therebetween.

12. A tool mounting assembly according to claim 11 further comprise releasable locking means, the releasable locking means being movable between a locking position in which the carriage and tool support means are held against relative rotation and an unlocked position.

13. A tool mounting assembly according to claim 12 wherein the releasable locking means includes a locking pin on one of the parts which is receivable in an aperture in the other of the parts.

14. A tool mounting assembly according to claim 13 wherein the assembly includes means for moving the carriage laterally.

15. A tool mounting assembly according to claim 11 wherein the tool support means includes tool holders for receiving the tool and enabling rotation of the tool about a rotation axis, the tool mounting assembly further including means for causing relative movement between the tool holders in the direction of the rotation axis so to enable tool holders to adopt an operative position in which the tool is held thereby and the release position in which to enable the tool to be removed from the mounting assembly.

16. A tool mounting assembly, the assembly including a tool support means for supporting a tool for rotation about a rotation axis, a tool sharpening device operatively connected to the tool support means and including a tool sharpening element which is movable relative to the tool support means and guide means for guiding the tool sharpening element relative to the tool, the relative movement between tool sharpening element and tool being substantially a traverse in the direction of the axis of rotation.

17. A tool mounting assembly according to claim 16 wherein the guide means is adjustable so that the path of traverse is at least one of linear and curved.

18. A tool mounting assembly according to claim 16 wherein the sharpening element includes an elongated member with a working tip at one end thereof and the guide means include a guide block to which the element is mounted.

19. A tool mounting assembly according to claim 18 wherein the guide block is receivable within a cooperating guide slot in the tool support means.

20. A tool mounting assembly according to claim 16 wherein the sharpening element is axially movable relative to the guide block.

21. A tool mounting assembly according to claim 20 wherein an adjustable screw element is provided for causing the axial movement.

22. A tool mounting assembly according to claim 16 wherein the tool support means includes tool holders for receiving a tool and enabling rotation of a tool about a rotation axis, the tool mounting assembly further including means for causing relative movement between the tool holders in the direction of the rotation axis so to enable the tool holders can adopt an operative position in which a tool is held thereby and the release position in which to enable a tool to be removed from the mounting assembly.

23. A tool mounting assembly according to claim 16 wherein a carriage and coupling means for coupling the tool support means to the carriage for rotation relative thereto are provided, so to enable a tool to be rotated about an axis generally at 90° to the axis of rotation.

24. A tool mounting assembly in accordance with claim 16 wherein a tool support means is provided, the tool support means including tool holders for receiving a tool and enabling rotation of a tool about a rotation axis, the tool mounting assembly further including means for causing relative movement between the tool holders in the direction of the rotation axis so that the tool holders can adopt an operative position in which to enable a tool is held thereby and the release position in which a tool to be removed from the mounting assembly, the tool mounting assembly further including a carriage and coupling means for coupling the tool support means to the carriage for rotation relative thereto so to enable a tool to be rotated about an axis generally at 90° to the axis of rotation.

* * * * *